(12) United States Patent
Swan

(10) Patent No.: US 8,333,592 B2
(45) Date of Patent: Dec. 18, 2012

(54) VIDEO-CAPTURED MODEL VEHICLE SIMULATOR

(76) Inventor: Andrew Warburton Swan, Glen Iris (AU)

(*) Notice: Subject to any disclaimer, the term of this patent is extended or adjusted under 35 U.S.C. 154(b) by 344 days.

(21) Appl. No.: 12/158,960

(22) PCT Filed: Dec. 6, 2006

(86) PCT No.: PCT/AU2006/001848
§ 371 (c)(1),
(2), (4) Date: Jun. 23, 2008

(87) PCT Pub. No.: WO2007/065210
PCT Pub. Date: Jun. 14, 2007

(65) Prior Publication Data
US 2009/0162814 A1 Jun. 25, 2009

(30) Foreign Application Priority Data
Dec. 6, 2005 (AU) .................................. 2005906826

(51) Int. Cl.
*G09B 9/05* (2006.01)
*G09B 9/04* (2006.01)
*G09B 9/048* (2006.01)

(52) U.S. Cl. ............... 434/69; 463/1; 463/6; 463/39; 463/40; 434/29; 434/62; 434/65; 434/66; 446/454

(58) Field of Classification Search .............. 434/62, 434/65–66, 69, 29; 463/1, 6, 39, 40; 446/454
See application file for complete search history.

(56) References Cited

U.S. PATENT DOCUMENTS

| 5,441,223 A * | 8/1995 | Young et al. ................. 246/4 |
| 6,439,956 B1 * | 8/2002 | Ho ........................... 446/454 |
| 7,211,000 B2 * | 5/2007 | Jutzi et al. ................. 463/40 |
| 7,265,663 B2 * | 9/2007 | Steele ........................ 340/531 |
| 7,991,492 B1 * | 8/2011 | Namanny et al. ............ 700/91 |
| 2001/0003715 A1 * | 6/2001 | Jutzi et al. ................. 463/40 |
| 2001/0045978 A1 * | 11/2001 | McConnell et al. ........ 348/42 |
| 2002/0138587 A1 * | 9/2002 | Koehler et al. ............ 709/207 |
| 2003/0105558 A1 * | 6/2003 | Steele ........................... 701/1 |
| 2005/0122920 A1 * | 6/2005 | Liu ............................ 370/310 |
| 2006/0100753 A1 * | 5/2006 | Katzer ....................... 701/20 |
| 2006/0226298 A1 * | 10/2006 | Pierson ...................... 246/1 R |
| 2006/0293102 A1 * | 12/2006 | Kelsey ....................... 463/37 |

FOREIGN PATENT DOCUMENTS

| BE | 1014884 A6 | 5/2004 |
| GB | 2412607 A | 10/2005 |
| SU | 588553 A1 | 1/1978 |
| WO | 9324915 A1 | 12/1993 |
| WO | 9926215 A1 | 5/1999 |
| WO | 9942978 A1 | 8/1999 |
| WO | 0017767 A1 | 3/2000 |

\* cited by examiner

*Primary Examiner* — Kang Hu
(74) *Attorney, Agent, or Firm* — Brooks Kushman P.C.

(57) ABSTRACT

The present invention provides a video-captured model vehicle simulator including at least one model vehicle, a track layout, at least one video imaging unit, at least one computer, at least one input device and/or control system and a customised software application whereby the simulator provides a user with a realistic simulation of the operation of a vehicle.

10 Claims, 2 Drawing Sheets

VIDEO-CAPTURED MODEL VEHICLE SIMULATOR

FIELD OF THE INVENTION

The invention relates to the area of vehicle and/or driving simulators, and in particular, to a model vehicle simulator which provides a user with a realistic simulation of the operation of a vehicle.

Whilst the invention can be tailored and applied to other model types of different vehicles, such as trams, forklifts or any other suitable vehicle, for convenience sake it shall be described herein in terms of a video-captured simulator for model trains and/or cranes.

BACKGROUND TO THE INVENTION

There are many train simulators in the marketplace which involve a computer software program, that a user is able to use on their computer, which has provided realistic train and travel route images taken from a driver's view inside a train cabin to enable a user to simulate the feeling of driving a train. These devices use a computer to drive the display in order to move the train relative to the track upon receipt of commands which may be sent via an input device such as a keyboard or mouse, or other remote control device.

The disadvantage with these simulators is that the images are computer generated and they cannot be coupled with a model train set to provide a more realistic feel for driving a train where the results can be visualised not only on the screen but by movement and control of the actual model train on the track layout.

Accordingly, it is an object of the present invention to overcome or substantially ameliorate the disadvantages of the prior art by providing a model vehicle simulator which provides a user with a realistic simulation of the operation of a vehicle.

SUMMARY OF THE INVENTION

The present invention provides a video-captured model vehicle simulator including:
at least one model vehicle;
a track layout;
at least one video imaging unit;
at least one computer;
at least one input device and/or control system;
and a customised software application whereby the simulator provides a user with a realistic simulation of the operation of a vehicle.

The model vehicle is preferably a train and/or crane.

The wireless camera is preferably located within the model vehicle to provide a driver's view of the images captured. The wireless camera may have provided a transmitter and receiver which may be provided separately or as an integral unit.

The customised computer software may preferably be adapted to have multiple functions which enable a user to control the model vehicle via the computer and receive and display constant feedback from the model vehicle.

It is further preferred that the software application is adapted to display an interactive interface on a user's screen in the form of a full screen image of the inside of a driver's cabin/cockpit. The software application is preferably provided with a playback function such that a user can record their journey and playback part and/or the entire journey.

It is preferred that there may be at least one input device connected to the computer or DCC system to control the various functions such as a keyboard, mouse, joystick, gamepad or the like.

The model train and track layout may preferably be controlled by a digital command control (DCC) system. The DCC system may preferably have provided a command station, a booster and a decoder. At least one electronic interface is preferably adapted to connect the command station of the DCC system to a computer.

In order that the invention may be more readily understood we will describe by way of non-limiting example of a specific embodiment thereof.

BRIEF DESCRIPTION OF THE DRAWINGS FIGURES

DESCRIPTION OF A PREFERRED EMBODIMENT OF THE INVENTION

Figure 1:
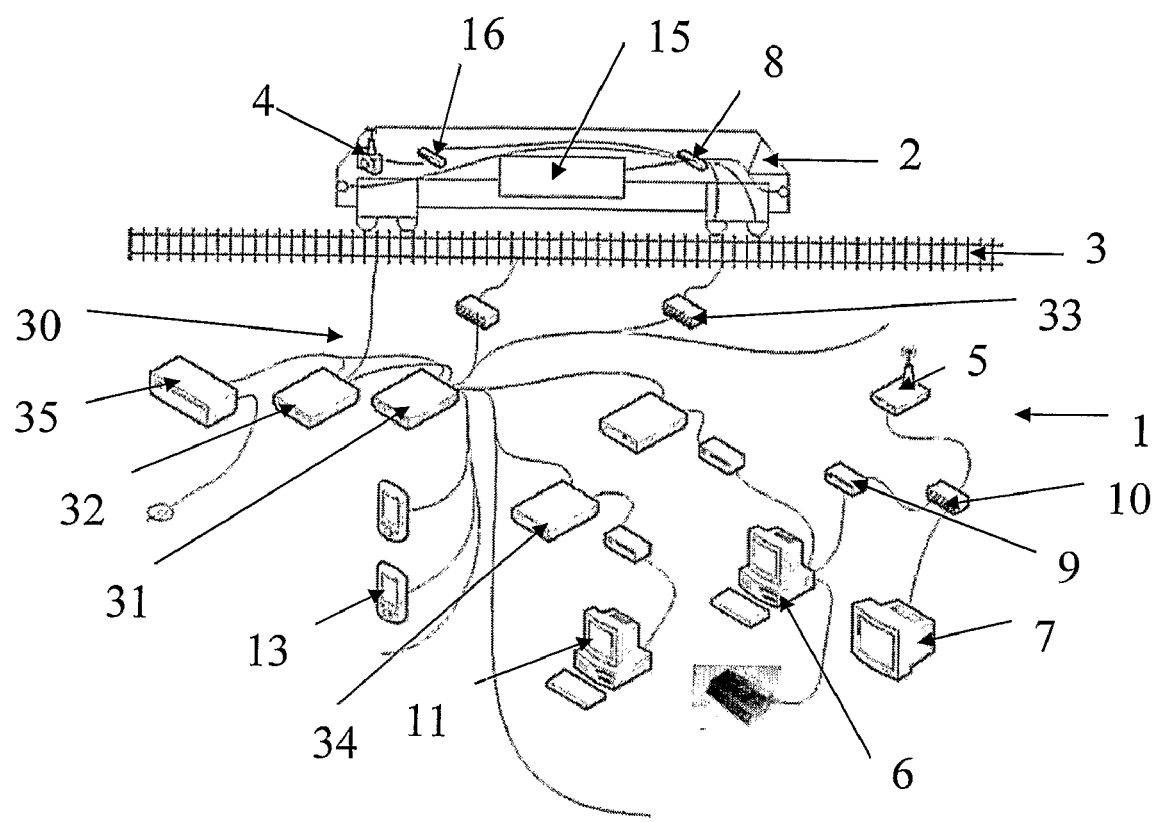
FIG. 1 shows a diagrammatic representation of the video-captured model vehicle simulator according to a preferred embodiment of the invention.
Figure 2:
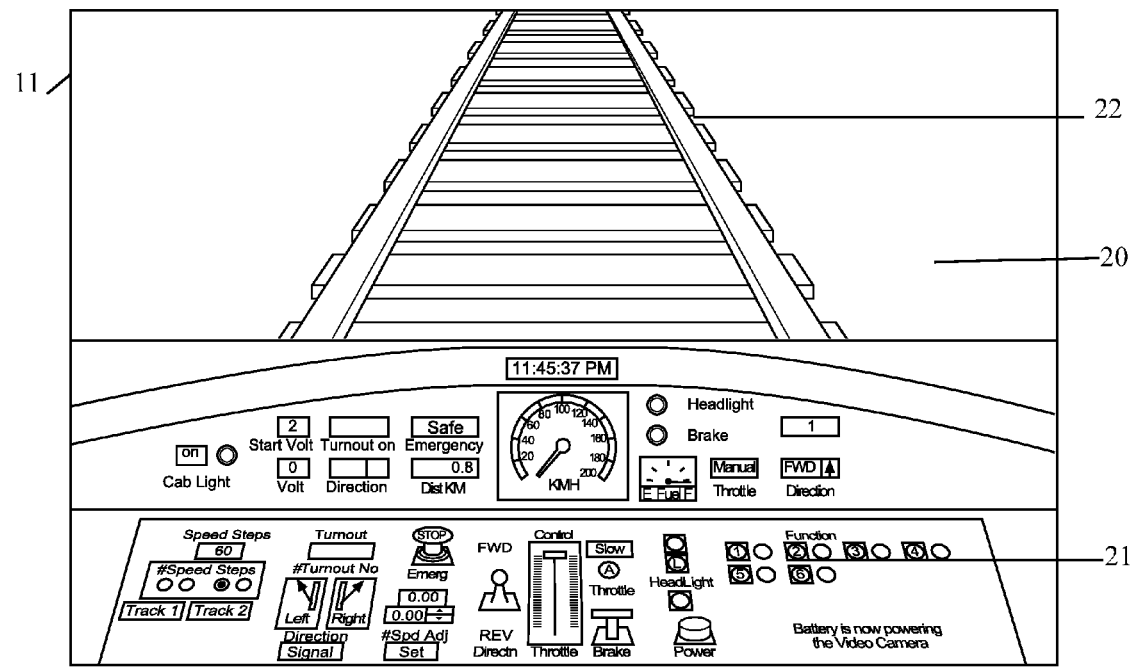
FIG. 2 shows a screen shot taken from the software application according to a preferred embodiment of the invention which is adapted to be displayed on a user's computer and/or television screen.

In this preferred embodiment, the invention provides a video-captured model vehicle simulator 1 which provides a means of enabling a user to simulate and operate a model vehicle 2 from their computer. Throughout the specification it is to be understood that the term model vehicle 2 is intended to refer to a model train and/or crane. However, it is envisaged that the invention could also be applied to any other suitable vehicle which is provided in a model form such as trams or forklifts or the like. In a first aspect of the invention, the model vehicle 2 is preferably a model train 2 which may be a steam, diesel or electric locomotive which is provided with its own track layout 3 that may be created by a user and/or be predesigned. In a second aspect of the invention, the model vehicle 2 is preferably a model crane which is provided with its own track/road/landscape layout 3 that may be created by a user and/or be predesigned. It is envisaged that the simulator 1 can be adapted to be utilized with any model train 2 and/or track layout of different shapes and dimensions.

The simulator 1 has provided at least one video imaging unit 4. The video imaging unit is preferably in the form of a video camera which is adapted to record still images showing a current image or location and/or provide continuous recording to enable a user to record their journey and play it back at a later stage. The video camera 4 is adapted to be fitted within the cabin of the model train and/or cockpit of the model crane 2. The video camera 4 should be positioned such that it is able to visualize and capture an image directly through the front windscreen of the train, to provide a user with hands on control and a driver's eye view of the journey via the co-active links between the console of the model vehicle 2 and video-imaging unit 4. It is envisaged that further additional video cameras 4 may be provided at different locations on the model vehicle 2 or track layout 3 to provide different views when controlling the model vehicle 2 and/or watching the journey.

The video camera 4 is preferably a micro-wireless video camera unit which has provided a colour analog or digital video camera 4 and a transmitter (not shown) which is adapted to transmit the live colour images to a receiver 5 that may be connected to a computer 6 and/or television screen 7 for display of the captured footage. The micro-wireless video camera 4 can be powered by a battery source and/or a decoder 8 or AC adaptor to enable continuous uninterrupted recording and use. It is envisaged that the micro-wireless video camera 4 can also have provided a microphone to enable sound to be recorded, such as the sound of the vehicle 2 moving along the track layout 3, horns sounding, the boom gates ringing or the like, in order to increase the realism of the simulator 1.

The receiver 5 is preferably a micro-wireless receiver unit which is adapted to receive live images or footage from a transmitter. The micro-wireless receiver unit 5 is adapted to have provided a video and/or audio output in order to relay the video and audio to an external source such as a computer 6 or television 7. The receiver unit 5 can be powered by a battery source and/or may have an AC adaptor or transformer to enable continuous uninterrupted use of the unit 5. Adapted to be connected to the wireless receiver unit 5 is an electronic video capture adapter 9 which can be connected to the video output of the receiver unit 5 via an RCA cable. The video capture adapter 9 is then plugged into a computer 6 via a USB port or any other suitable connection to enable the picture to be transferred onto the screen 11 of the computer 6. Where a user wishes to have the image displayed on more than one computer 6 and/or television 7, an adapter divider 10 can be used to split the signal between the two or more devices.

The simulator 1 preferably has provided at least one computer 6 which is adapted to display and control a specific model vehicle on the track layout 3. The number of computers 6 which can be employed is dependent on the number of channels provided on the camera transmitter/receivers units 5. The computer 6 preferably has provided random access memory (RAM), read-only memory (ROM), an operating system, a sound card, a graphics card, a motherboard, and at least one USB and/or other connection port.

The system 1 preferably has a provided a customised software application 12 which is adapted to be in the form of a computer simulator program which has multiple functions that enable a user to control the train via the computer simulator program 12 and receive and display constant feedback from the model vehicle 2. The simulator program 12 is adapted to be installed on a user's computer and run as a program displayed on the screen 11 of the computer 6. The software 12 displays an interactive interface on a user's screen 11 in the form of a full screen image of the inside of a driver's cabin/cockpit showing the windscreen 20 and various controls on the control console 21 within the cabin/cockpit. The windscreen 20 is preferably adapted to display the captured video image 22 recorded by the micro wireless video camera 4. It is envisaged that the software 12 is preferably provided with a playback function such that a user can record their journey and playback part and/or the entire journey. The user is also preferably able to select between a left and/or right hand driver position for viewing on the screen 11. It is envisaged that the software application may be modified to suit different models, control systems and/or applications.

The model train simulator is preferably adapted to display and have, but not be limited to, the following functions which can be controlled by a user:
Views of drivable locomotives including diesel, electric, shunter, railcar, high-speed
Train Driver Compartment, Console & Controls, and the Video captured image is displayed on the windscreen area
Gear shift knob: Forward—Neutral—Reverse Function
Acceleration & Deceleration Throttle
  (Automatic or Manual—controlled either
    from mouse—wheel or left click button—hold down and drag or
    from the keyboard—up and down arrow buttons)
Brake knob
Speedometer—accurate needle movement and reading
Speedometer Settings
  Speed & Needle adjustment,
    Either prototype in KM/H or Scales range from Z to G in meters per minute
Accurate Distance Reading—either Prototype in KM's or Scale range from Z to G in meters
Distance Reading Settings
  Distance adjustment
    Prototype in KM or Scales range from Z to G in meter
    Save Distance Function for a particular locomotive
Emergency Stop & Reset Button
Head & Rear Light Button
Day/Night Driver Compartment Light Off/On function
Function Buttons—Up to 12 functions
Turnout/Point Button
Speed Step Settings (14, 27, 28 or 128)
Speed Rate Settings
Manual or Automatic Train/Camera direction
Locomotive Memory/Save function
RailDriver Desktop Cab Controller Settings The model crane simulator is preferably adapted to display and have, but not be limited to, the following functions which can be controlled by a user:
Views of drivable cranes including train, coaling, gantry, container, overhead loading, construction
Crane Cockpit/Compartment, Console & Controls, and the Video captured image is displayed on the windscreen area
Crane console—Left or Right hand side position and control type selection
1 or 2 Joystick knobs: Hook—Up & Down, Jib Up & Down and Crane Rotation—Left & Right Function
Emergency Stop & Reset Button
Day/Night Driver Compartment Light Off/On function
Function Buttons—Electromagnet, Working light, Excavator shovel & other optional functions
Speed Step Settings (14, 27, 28 or 128)

The control and movement of the above controls and functions can preferably be seen on the screen with additional functions such as day and night vision, interface connection memory and the ability to save model vehicle code and settings to bypass default configuration and settings. The simulator has provided at least one input device 13 for entering or selecting commands to control various functions such as a keyboard, mouse, joystick, gamepad or the like which can be preferably connected to the computer and/or command station of a DCC system 14. It is envisaged that the input device can also be a desktop cab console controller which is adapted to have buttons and/or components that are specific for each function and adapted to replicate the console components of a vehicle. In this arrangement, the system may preferably have "linear" or "non-linear" control type selections/settings for connection to, and use of, the desktop cap console controller. In a further embodiment of the invention it is envisaged that a USB interface conventional controller may be employer for use with a conventional control system.

The simulator 1 preferably has provided a digital command control (DCC) system 30 which is adapted provide a control system for the model vehicle 2 and track layout 3. It is envisaged that the simulator can be used in associated with an existing DCC system or alternatively, a universal controller device/conventional control system may be provided. The DCC system 30 is preferably powered by a transformer 35 or AC adapter to provide a constant power supply to all connected components of the system 1. The DCC system 30 preferably has provided a decoder 8 onboard the model vehicle 2 which has provided an output to power the motor 15 of the model vehicle 2 and is adapted to control the speed and direction of the motor 15 by receiving digital signals which may be superimposed over a constant AC track voltage. The decoder 8 may also have provided a number of auxiliary outputs which are adapted to power other functions such as the lights, smoke and sound or the like located on the motor vehicle 2 and/or track 3. It is envisaged that the decoder 8 may also function to power stationary operations such as points or signals or the like provided on the track layout 3. An anti-interference adapter 16 is preferably adapted to be connected between the micro-wireless camera 4 and the decoder 8.

The DCC system 30 preferably has provided a Command Station 31 which is adapted to generate a DCC signal (not shown) and a Booster 32 which is adapted to receive the DDC signal from the command station 31 and convert the signal to an AC track voltage. The DCC signals are then detected and responded to by the decoder 8 provided on the model vehicle 2 to control the speed and direction of the vehicle 2 independently of other devices on the track layout 3. The DCC system 30 preferably has provided at least one feedback module 33 which is adapted to be connected from the command station 31 to a point along the track layout 3 to ensure that the DCC signal sent from the command station 31 is being followed and maintained correctly.

The simulator has provided at least one electronic interface 34 which is adapted to be connected from the command station 31 of the DCC system 30 to a computer 6 via a USB port or other suitable connection means. As such, the computer 6 can be used to send commands to the command station 31 which will convert the command into a DCC signal that can be received and responded to by the model vehicle 2.

In practice, once a user has installed the computer software, they will be able to open the simulator program 12 via the "All Programs" bar from the "Start" Menu bar or from an icon on their desktop using an input device 13 such as a keyboard or mouse. Once the program 12 has been opened, the full screen image of the driver's cabin/cockpit of the model vehicle 2 will be displayed on the screen 11. There may preferably be provided a menu bar located at the top of the screen 11 which enables a user to adjust various settings and options ranging from background colour selection to being able to activate a media player to playback a recorded vehicle journey. The menu bar may preferably have, but not be limited to, the following categories:
  1. System settings
     a. Exit
     b. Day/night vision functionality
     c. Automatic/Manual settings for camera and model vehicle control
     d. Save
  2. Window Size (Resolution) Seffing)
  3. Vehicle Control/Console Setting
  4. Video Control/Configuration Setting
  5. Video Image Size Setting
  6. Video Recording
  7. Help Provided along the bottom of the screen can be a status bar displayed indicating the status of the interface connection and the video system progression. There may be provided a "continue" button or the like displayed on the screen 11 which enables a user to proceed to the next page detailing interface selection and configuration settings and options to set the interface connection.

It is envisaged that when a user logs in for the first time, they will be prompted to enter in an unlock key (not shown) or code to validate that they have bought a secure and licensed version of the simulator 1. This key or code may be obtained by emailing a service provider (not shown) with the details and serial number provided on the purchased product. Once the serial number and/or license has been approved, the user will then be able to access the simulator 1 by entering the unlock key or code, On first use of the software, the user may be preferably directed to the configurations and settings page to complete the settings for the model vehicle 2. Once these settings have been completed the user will then be able to proceed to the driver's cabin/cockpit screen displaying the full screen image of the windscreen 20 and controls console 21. At this time the configuration and settings may also be changed for the video system interface connection and video image via a pop-up window or the like or via the menu bar. In a preferred embodiment of the invention, once the video settings have been completed, the captured video image 22 will begin being displayed on the screen and the controls of the console 21 will become activated and may be used to operate and control the model train.

While we have described herein a particular embodiment of the video-captured model vehicle simulator, it is further envisaged that other embodiments of the invention could exhibit any number and combination of any one of the features previously described. However, it is to be understood that any variations and modifications can be made without departing from the spirit and scope thereof.

I claim:

1. A video-captured model vehicle simulator comprising:
   at least one drivable model vehicle which is configured to draw electrical power from a track layout;
   at least one wireless camera unit installed on the at least one model vehicle and which is positioned inside the at least one model vehicle thereby to capture a driver's view from within the at least one model vehicle for remote display;
   at least one computer;
   at least one control system which includes at least one input device and is interfaced with the at least one computer to allow control of the operation of the at least one model vehicle from the at least one computer;
   and a customized software application which is operated on the at least one computer;
   wherein the at least one control system is configured to control operation of the at least one model vehicle from a remote location with the at least one input device using control commands which are superimposed over an electrical current applied to the track layout thereby to remotely control operation of the at least one model vehicle;
   wherein the customized software application is configured to adapt the display of the video from the wireless camera unit to provide a selection of views so that the driver's view can be altered to display in real time driving conditions at least ahead of the at least one model vehicle the selected view of the different simulated cockpits;
   and wherein the at least one control system is configured to send control commands to the at least one model vehicle using an electrical current and to receive wirelessly from the wireless camera a video signal thereby preventing interruption of the video signal by the control signal;

whereby the simulator provides a user with a realistic simulation of the operation of the at least one model vehicle.

2. A video-captured model vehicle simulator as claimed in claim 1
wherein the model vehicle is a train;
wherein the at least one control system is configured to include, mounted inside the at least one model, a signal decoder device and an anti-interference adapter;
wherein the at least one camera is configured to draw power from the signal decoder device;
and wherein the anti-interference adapter is positioned in between the at least one camera and the signal decoder and prevents interruption of the video signal by the control signals, sent to the signal decoder device for use to operate at least the at least one mode vehicle, with the video signal.

3. A video-captured model vehicle simulator as claimed in claim 2 wherein the wireless camera has provided a transmitter and receiver which are provided separately.

4. A video-captured model vehicle simulator as claimed in claim 3
wherein the customized software application has multiple functions configured to control the at least one model vehicle from the at least one computer thereby to control different simulated drivable vehicles.

5. A video-captured model vehicle simulator as claimed in claim 4 wherein the at least one input device is adapted to be connected to the at least one computer to control the various functions of the at least one model vehicle on the track layout;
and wherein the at least one input device is selected from any one of the following: a keyboard, mouse, joystick, and a gamepad.

6. A video-captured model vehicle simulator as claimed in claim 5 wherein the control system is a digital command control system which includes a command station, a booster, a decoder, and at least one electronic interface which is adapted to connect the command station to the at least one computer.

7. A video-captured model vehicle simulator as claimed in claim 6 wherein the software application is provided with a playback function such that a user can record their journey and playback part or the entire journey which the user has made with the at least one vehicle on the track layout.

8. A video-captured model vehicle simulator comprising:
at least one drivable model vehicle which is configured to draw electrical power from a track layout;
at least one wireless camera unit installed on the at least one model vehicle and which is positioned inside the at least one model vehicle thereby to capture a driver's view from within the at least one model vehicle for remote display;
at least one computer;
at least one control system which includes at least one input device and is interfaced with the at least one computer to allow control of the operation of the at least one model vehicle from the at least one computer;
and a customized software application which is operated on the at least one computer;
wherein the at least one control system is configured to control operation of the at least one model vehicle from a remote location with the at least one input device using control commands which are superimposed over an electrical current applied to the track layout thereby to remotely control operation of the at least one model vehicle;
wherein the customized software application is configured to adapt the display of the wireless camera video to provide a selection of views of different drivable vehicles so that the driver's view can be altered to display in real time driving conditions at least ahead of the at least one model vehicle of different simulated cockpits;
wherein the at least one control system is configured to include, mounted to the at least one model, a signal decoder device and an anti-interference adapter;
wherein the at least one camera is configured to draw power from the signal decoder device;
wherein the anti-interference adapter is positioned in between the at least one camera and the signal decoder and prevents interruption of the control signals, sent to the signal decoder device for use to operate at least the at least one mode vehicle, with the video signal;
and wherein the signal decoder device and the anti-interference adapter allows the at least one control system to be configured to send control commands using an electrical current and to receive wirelessly from the wireless camera a video signal so that different communication streams are used to prevent the interruption by the control signals with the video signal.

9. A method of operating a video-captured model vehicle simulator as claimed in claim 1; the method including the steps of:
sending with the control system control commands to the at least one drivable model vehicle using an electrical current for processing by the signal decoder device of the control system to allow the control system to remotely control the at least one drivable model vehicle,
receiving wirelessly from the at least one drivable model vehicle video imagery, taken by the at least one wireless camera, for display on the at least one computer; an anti-interference adapter is positioned in between the at least one camera and the signal decoder device to prevent interruption by the control signals with the video signal.

10. A video-captured model vehicle simulator as claimed in claim 6, wherein the control system has at least one feedback module which is connected from the command station to a point along the track layout to ensure that the control system signal from the command station is being followed and correctly maintained.

* * * * *